Sept. 6, 1949.  V. SABATELLA  2,481,352
EGG BEATER
Filed April 21, 1948  2 Sheets-Sheet 1
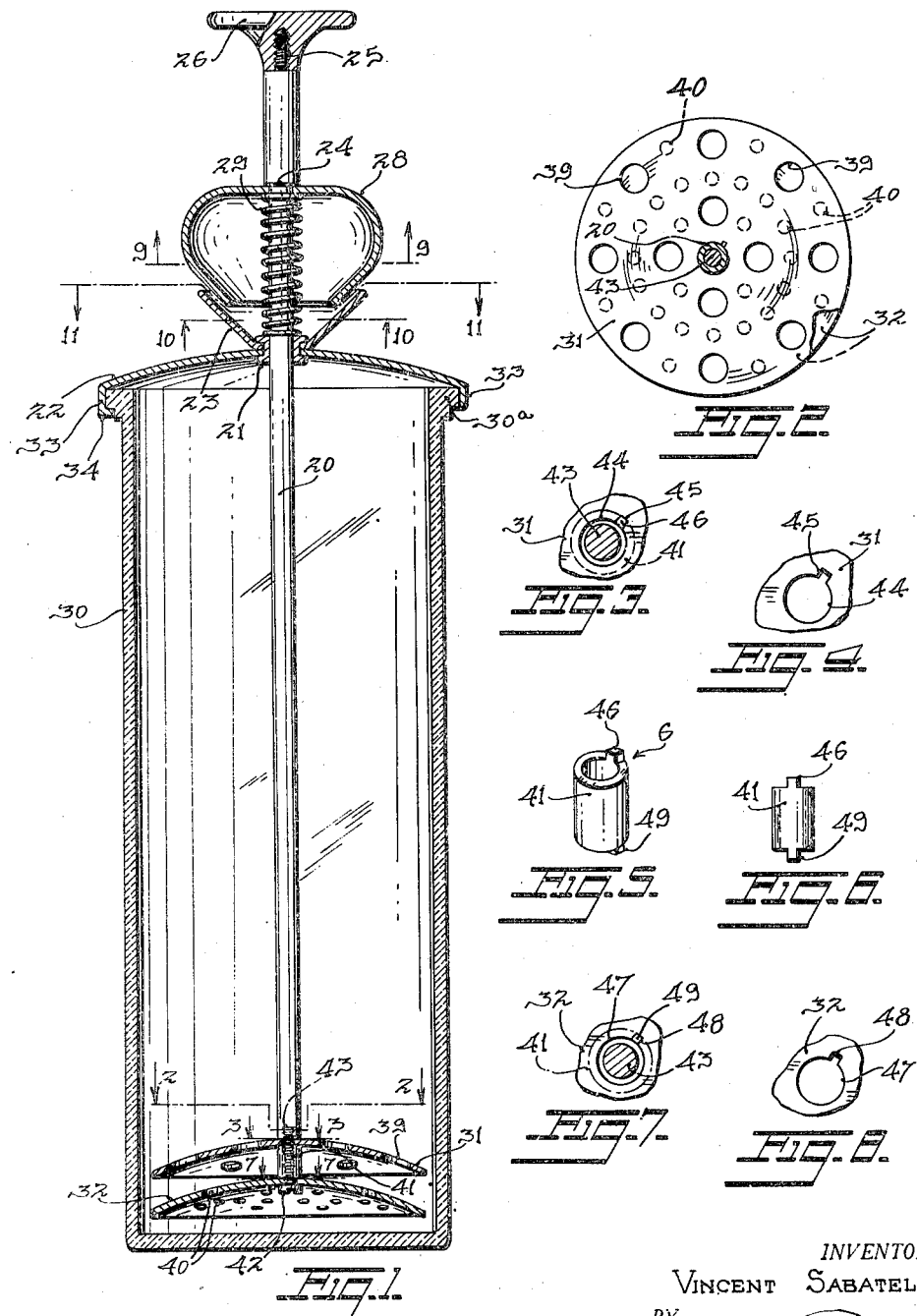
INVENTOR.
VINCENT SABATELLA
BY
ATTORNEY Sept. 6, 1949. V. SABATELLA 2,481,352
EGG BEATER
Filed April 21, 1948 2 Sheets-Sheet 2
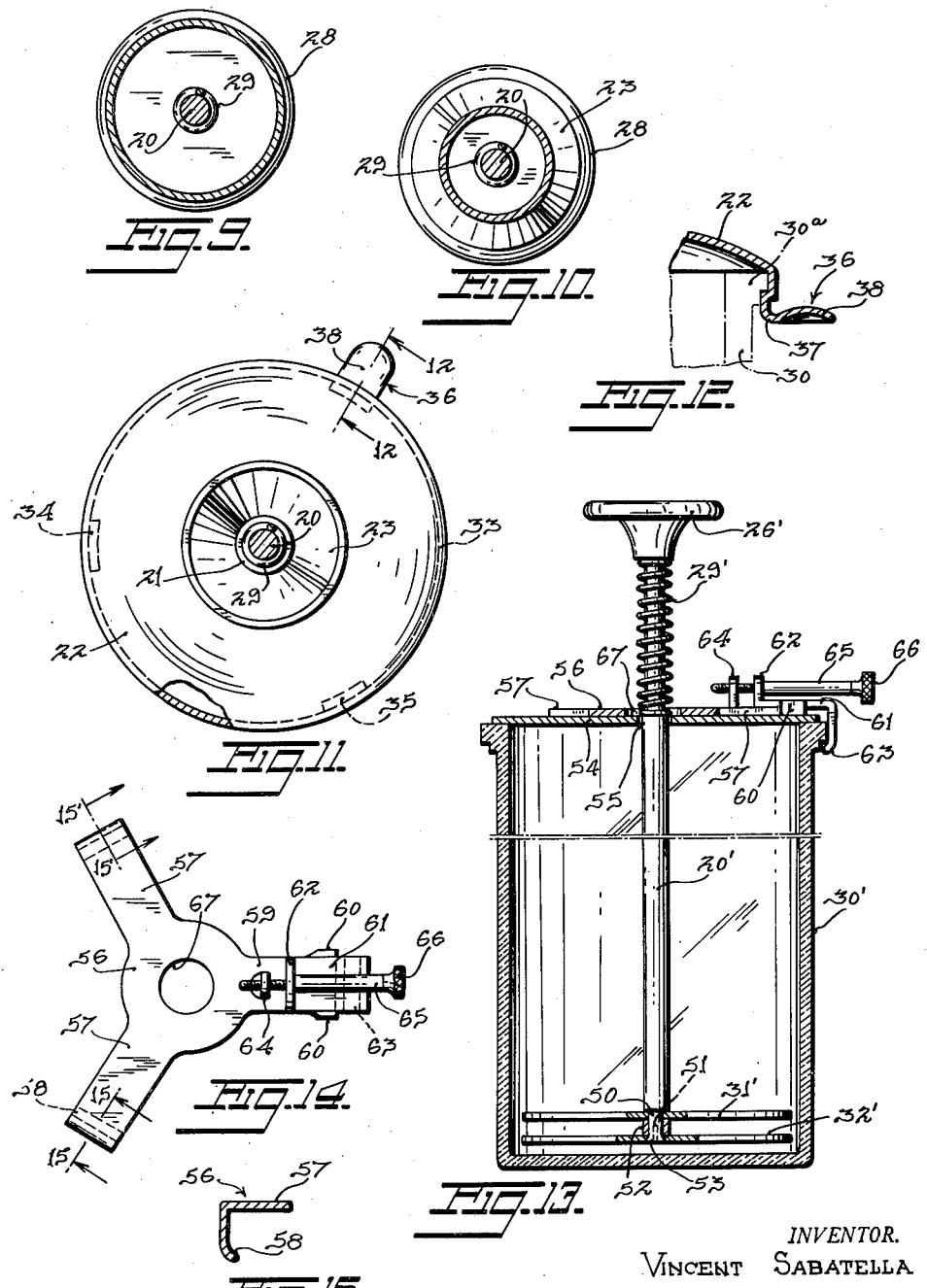
INVENTOR.
VINCENT SABATELLA
BY
ATTORNEY Patented Sept. 6, 1949

2,481,352

UNITED STATES PATENT OFFICE 2,481,352

EGG BEATER

Vincent Sabatella, New York, N. Y.

Application April 21, 1948, Serial No. 22,409

5 Claims. (Cl. 259—113)

1

This invention relates to new and useful improvements in so-called egg-beaters, that is, devices for beating and emulsifying cream, eggs and other food articles or combinations thereof.

The device of the invention is adapted for attachment to a jar or other vessel by being temporarily secured to the latter adjacent the top open mouth thereof. While a special jar or vessel may be supplied with the beater of the invention, the device as now devised is intended for interchangeable use with any one of a number of suitable vessels happening to be on hand in the kitchen, such as an emptied glass jar of the kind used for packaging a food product.

A feature of the invention is the provision of a reciprocable rod having a top handpiece and carrying near the bottom thereof, to have a field of operation at the interior of the vessel used, a plurality of dashers, each of which is an apertured disk, with the disks so shaped and held on the rod that not only will the apertures in the disks be out of alignment but a lower disk will have apertures of smaller size than those of a disk thereabove.

Another feature of the invention is the provision of a cap or cover structure for the vessel and relative to which cover structure said rod is reciprocable, in combination with an expansile helical spring sleeved on the rod and arranged to become tensioned incidental to a downstroke of the dasher means and so to act for urging upward movement to the rod to raise the same in preparation for another downstroke of the dasher means.

A further feature of the invention is the provision of a cap or cover for the purpose just stated, and one which is quickly and easily attachable to and removable from the upper portion of the vessel, and a cap or cover, also, which may be practicably made so as to be fittable to any one of several vessels the upper portions of which are of different diameters.

Still another feature of the invention is the provision of means whereby, with a liquid-tight joint avoided between the rod and the cover, thereby to render manual operation of the beater easy and rapid, any fluid material splashed up alongside the rod and through the cover will always be drained back for certain return to the interior of the vessel.

An object of the invention, also, is to provide a construction throughout which is rugged and long-lived, yet a device reliable in operation although relatively inexpensive to manufacture, and, furthermore, a device which may be easily properly cleaned and so kept perfectly sanitary.

2

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is mainly a vertical axial section, showing an embodiment as now preferred, with the dasher means shown at the conclusion of a beating stroke and hence with said spring compressed.

Fig. 2 is a top plan view, partially broken away, of the dasher means, this view being a horizontal section taken on the line 2—2 of Fig. 1.

Fig. 3 is a fragmentary top plan view, on an enlarged scale, of the upper disk of the dasher means shown in Fig. 1, this view being taken on the line 3—3 of Fig. 1.

Fig. 4 is a similar view of said upper disk, to show more clearly a central aperture therethrough.

Fig. 5 is a perspective view, also on an enlarged scale, of a collar or sleeve between the two disks.

Fig. 6 is an elevational view, looking in the direction of the arrow 6 of Fig. 5.

Fig. 7 is a view similar to Fig. 3, but in regard to the lower disk of the dasher means, this view being taken on the line 7—7 of Fig. 1.

Fig. 8 is a view similar to Fig. 4, but in regard to said lower disk.

Fig. 9 is a horizontal section, taken on the line 9—9 of Fig. 1.

Fig. 10 is a similar section, taken on the line 10—10 of Fig. 1.

Fig. 11 is likewise a horizontal section, this taken on the line 11—11 of Fig. 1.

Fig. 12 is a detail view, being a vertical section taken on the line 12—12 of Fig. 11.

Fig. 13 is a view similar to Fig. 1, but showing a modification.

Fig. 14 illustrates in top plan certain of the elements seen partially in section and partially in side elevation in Fig. 13.

Fig. 15 is a view similar to Fig. 12, taken either on the line 15—15 or on the line 15'—15' of Fig. 14.

Referring to the drawing more in detail, and first to Figs. 1 to 12, the beater here illustrated comprises a rod 20 endwisely freely slidable through the central opening of a ring 21 of lazy-U cross-section seated in a cover 22 at a central aperture through the latter. Said ring, which may be of rubber, a plastic or even in the form of a metal grommet or eyelet, also serves to mount rigidly on the cover 22 a substantially conical cup 23. Said cup has a central bottom aperture, attended by a horizontal annular flange, for seizure of such flange, together with the portion of the cover 22 marginal to its said central aperture, by the ring 21.

The rod 20 is shouldered at 24, and is of increased diameter above said shoulder; and the upper end of the rod is reduced and threaded as at 25, for taking a matching internal thread of a tapped hole extended up into the hub portion of a handpiece 26.

A splash collection shell 28, outwardly bulged circumferentially intermediate its height, and open at its lower end and there having a mouth of a diameter less than that of the upper rim of the cup 23, is provided at its top with an aperture centralized relative to said mouth. By way of said aperture the shell 28 is seated at its upper side under the shoulder 24 of the rod 20. Sleeving the rod 20, between the underside of the top of the shell 28 and the ring 21, is an expansile coil spring 29.

The cover 22 is shown as mounted on a glass jar 30, as any such jar available to the owner of the new beater, and having a diameter, external to its commonly carried peripheral bead 30a at its upper end, which so substantially agrees with certain dimensional characteristics of the cover 22 as to allow the same to be secured to such jar by a simple means to be described as this specification proceeds.

In selecting the jar to be used, the internal contour thereof is relatively unimportant, except that the jar should have a diameter over the entire length of a desired extent of reciprocation of the rod 20 not less than the diameter of the dasher disks, which latter, two of which being here shown at 31 and 32, are preferably, as also shown, of the same diameter. Preferably, also, a jar will not be selected which would be of too great a height to prevent the dasher means to be brought fairly close to the bottom of the jar on a beating stroke of the rod 20 of maximum possible extent.

The cover 22 (compare Fig. 1 with Figs. 11 and 12) includes a depending cylindrical skirt 33, which, at its bottom, and at points spaced 120° therearound, is provided with gripping means for the bead 30a of the jar 30. Two of these gripping elements 34 and 35 are alike, these being hook-like claw extensions as shown in Fig. 1 in the case of the element 34.

The third of said gripping elements, 36, incorporates a root portion corresponding to an element 34 or 35, and then is extended downwardly and outwardly to provide a curvature 37 and beyond the latter a substantially horizontal and upwardly dished finger-piece 38. The cover 22 is preferably made of a resilient sheet material, as a spring metal; so that, with the finger-piece 38 manually sprung upward by elastic yield at said curvature 37, the elements 34 and 35 may be hooked in under the bead 30a, and then, on release of the finger-piece, the hook formation at the top of the curvature 37 may be snapped in under said bead.

With both of the disks 31 and 32 apertured, and with both upwardly dished as illustrated in Fig. 1, but (Figs. 1 and 2) with the apertures 39 of the disk 31 larger than the apertures 40 of the disk 32, the two disks are fixedly carried by the rod 20, with the disk 31 spaced above the disk 32. The thus spaced securement of the two disks to said rod is, as shown in Fig. 1, by means of a sleeve 41 having a smooth cylindrical bore, and a screw 42. Said screw is sent upward, first through a central aperture in the disk 32, said aperture of about the same diameter as that of the bore of said sleeve; then through said bore; then through a central aperture in the disk 31 corresponding to that through the disk 32; and then into a tapped hole 43 in the bottom portion of the rod 20.

By this manner of mounting the disks 31 and 32 on the rod 20, the disks may be readily removed from the rod, thereby allowing separation of the rod and the cover 22, and thereby in turn allowing removal of the spring 29 and the shell 28 from the rod. Thus it is possible, frequently, and easily, to disassemble the device, for thorough washing and cleaning of all parts, and then to reassemble the device; all without the use of special tools of any kind.

In order, nevertheless, always to insure reassembly of the dasher means on the rod 20 such that the disks 31 and 32 will be locked in place with the apertures of one disk staggered relative to the apertures of the other, the central aperture through the disk 31, as shown at 44 in Fig. 4, is mainly circular, but with a minor extension 45. The diameter of the main circular portion 44 of said aperture is the same as the external diameter of the sleeve 41, and said aperture's said extension 45 is shaped to snugly receive a projection 46 on the upper end of said sleeve. The disk 32 has its central aperture like that of the aperture of the disk 31; that is, said aperture of the disk 32 is mainly circular as shown at 47 in Fig. 8 and of a diameter the same as the external diameter of the sleeve 41, and its minor extension 48 is shaped to snugly receive a projection 49 on the bottom end of said sleeve.

In using the device, as temporarily attached to a suitable jar filled with the article or articles to be beaten or emulsified, the jar is rested upright on a suitable support, and by way of the handpiece 26 the rod 20 is reciprocated by being repeatedly pressed downward on each down stroke of the dasher means and the spring 29 is tensioned, so that at the end of each such stroke the return stroke is effected or materially aided by said spring.

The different sizes of the apertures in the disks 31 and 32, with these apertures staggered, allows the beating or emulsifying to be completed in a markedly easy and rapid way. The liquid agitation is intense and extensive; but any liquid splashed upward alongside of the rod 20 and through the cover 22 is collected in the shell 28 and dropped from the bottom of the latter into the cup 23 for return to the interior of the jar 30.

Referring to Figs. 13–15, wherein a jar 30' similar to the jar 30 is shown, the parts here illustrated and to which are applied reference numerals with primes added correspond, respectively, to the parts to which are applied reference numerals without primes.

The disks 31' and 32', although here shown as flat, are apertured in the same differential manner as explained in connection with the disks 31 and 32. The staggering of said apertures is maintained by riveting the two disks to the bottom of the rod 20'; and as here illustrated this riveting is effected by providing at the lower end of the rod 20' a reduced cylindrical extension 50, recessed as indicated at 51, by passing said extension through a matching central aperture in the disk 31', by next applying a cylindrical sleeve 52 to said extension below the disk 31', by then passing the lower end of said extension through a central aperture in the disk 32' and having a countersunk bottom, and by finally heading over, as indicated at 53, the tubular-rivet element constituted by the recessed bottom of said extension 50.

The cover structure of Figs. 13-15 incorporates a flat circular plate 54 having a central aperture 55 for taking about the rod 20', and an overlying spider 56 having two like arms 57, each downbent at its outer end to provide a clasping member 58. The arms 57 are 120° apart, and midway between them is a shorter arm 59 having two upbent side tabs 60 for guidingly engaging the sides of a slide 61 having an inner end portion upbent to provide an ear 62; this arm 59 being downbent at its outer end to provide a clasping member 63. Struck up from the arm 59, near its inner end, is a tongue 64 having an aperture threaded to match the thread of a screw 65 having a knurled head 66. The thread of the screw is on a shank portion of smaller diameter, this shank portion traversing an unthreaded aperture through the tongue 62. The screw shank, between its said thread and its head 66, is of increased diameter to provide a shoulder to bear against the ear 62.

Thus, on turning the screw to move the slide 61 inwardly, after the two clasping members 58 have been engaged with the jar top, the clasping member 63 is jammed to the position illustrated, thereby to lock the spider 56 and consequently the plate 54 on the top of the jar; while on turning the screw in the opposite direction, all the clasping members are released for removal of the spider and plate.

The spider 56 has a central aperture 67, larger than the aperture 55 through the plate 54, and the spring 29', at its lower end entering the aperture 67, sleeves the rod 20' between the plate 54 and the handpiece 26'.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a beater having a cover for a jar or vessel and having an opening with a reciprocable rod traversing the opening and a handpiece at the top of the rod for manually giving the same a downstroke, beater means on the rod below the opening, and including two disks one spaced below the other, each of said disks having a plurality of apertures, a collecting cup having an open top mounted on the top of the cover and surrounding the rod, and a splash collecting means carried by the rod above said cup, comprising a shell closed at its top and having downwardly and inwardly extended bottom wall portions all converging toward a spill mouth of a diameter less than the diameter of the open top of said collecting cup at the bottom of the shell.

2. A beater comprising a cover for a jar or vessel and having an opening, a reciprocable rod traversing said opening, a handpiece at the top of said rod for manually giving the same a downstroke, and beater means on the rod below said opening, said beater means including two disks one spaced below the other, each of said disks having a plurality of apertures, there being a splash collecting means carried by the rod above the cover, and including a shell closed at its top and having downwardly and inwardly extended bottom wall portions all converging toward a spill mouth at the bottom of the shell, there also being a cup fixed on the cover and connecting at its bottom with the opening in the cover, said cup having its open top of such expanse that all points therearound lie beyond any point around said spill mouth.

3. A beater comprising a cover for a jar or vessel and having an opening, a reciprocable rod traversing said opening, a handpiece at the top of said rod for manually giving the same a downstroke, and beater means on the rod below said opening, said beater means including two disks one spaced below the other, each of said disks having a plurality of apertures, there being a splash collecting means carried by the rod above the cover, and including a shell closed at its top and having downwardly and inwardly extended bottom wall portions all converging toward a spill mouth at the bottom of the shell, there also being a cup fixed on the cover and connecting at its bottom with the opening in the cover, said cup having its open top of such expanse that all points therearound lie beyond any point around said spill mouth, said shell at its top being apertured for there embracing the rod and the rod being annularly shouldered above the top of the shell to close said aperture, and there being an expansile coil spring sleeving the rod and traversing said shell and cup and bearing at its upper end against the shell and at its lower end against the cover.

4. In a beater having a cover for closing the open top of a jar and formed with a central opening through which a rod slidably passes and a shoulder formed on the rod above the cover, a collecting cup having an open top mounted on the cover concentric with the opening and through which the rod also slidably passes, a collecting shell having an apertured flat top wall through which the rod passes and a downwardly and inwardly converged circular wall terminating in a bottom mouth opening concentric with the rod, and a coil spring on the rod between said cup and said shell retaining the rod in a raised position relative to the cover and retaining said collecting shell in a position with the top face of the top wall thereof about its aperture in abutment with the shoulder of the rod.

5. In a beater having a cover for closing the open top of a jar and formed with a central opening through which a rod slidably passes and a shoulder formed on the rod above the cover, a collecting cup having an open top mounted on the cover concentric with the opening and through which the rod also slidably passes, a collecting shell having an apertured flat top wall through which the rod passes and a downwardly and inwardly converged circular wall terminating in a bottom mouth opening concentric with the rod, and a coil spring on the rod between said cup and said shell retaining the rod in a raised position relative to the cover and retaining said collecting shell in a position with the top face of the top wall thereof about its aperture in abutment with the shoulder of the rod, the diameter of the bottom mouth of said collecting shell being less than the diameter of the open top of said collecting cup.

VINCENT SABATELLA.

(References on following page)

REFERENCES CITED

The following references are of record in the file of this patent:

UNITED STATES PATENTS

| Number | Name | Date |
|---|---|---|
| 194,203 | Wilcox et al. | Aug. 14, 1877 |
| 903,515 | Snyder | Nov. 10, 1908 |
| 1,116,230 | Boyd | Nov. 3, 1914 |
| 2,291,708 | Gluck | Aug. 4, 1942 |

FOREIGN PATENTS

| Number | Country | Date |
|---|---|---|
| 333,081 | Germany | Apr. 23, 1919 |